Patented Apr. 24, 1923.

1,453,132

UNITED STATES PATENT OFFICE.

KARL HEINEMANN, OF HEIDENAU, GERMANY.

PROCESS FOR THE RECOVERY OF PURE ALKALIES FROM IMPURE LYES.

No Drawing. Application filed November 8, 1920. Serial No. 422,734.

*To all whom it may concern:*

Be it known that I, KARL HEINEMANN, a citizen of Germany, and a resident of Heidenau, Saxony, have invented new and useful Improvements in a Process for the Recovery of Pure Alkalies from Impure Lyes (for which I filed application in Germany, June 6, 1916), of which the following is a specification.

The present invention relates to a process for the recovery of pure caustic alkalies from impure lyes. Solutions of caustic alkalies are employed as reagents in a number of different industries and waste lyes are thereby formed which in consequence of the substances they absorb are useless for other purposes, although they frequently contain a large part of the caustic alkali, amounting in many cases to almost the entire quantity used.

For instance, in the manufacture of artificial silk a waste caustic soda lye is produced containing about 17 per cent of sodium hydroxid, 2 per cent of β- or γ-cellulose and other organic substances which are scarcely investigated up to date. Many attempts have been made to remove the said impurities from such lyes, but they have not been successful, as it was found impossible to eliminate from the lyes the chemicals added thereto for the purpose of purifying them.

According to the present invention entirely pure caustic alkali is recovered from impure lyes of the above nature. For this purpose the lye is electrolyzed, mercury cathodes being used and the alkali amalgam thus formed is subsequently decomposed by water. Platinum, nickel, or silver may be employed as the metal for the anodes and a useful by-product in the form of pure oxygen can then be obtained.

In order to prevent the contamination of the oxygen by hydrogen which may be generated at the cathode in consequence of interruptions in the operation of the plant, a porous diaphragm may be employed which may take the form of fine wire gauze, for example. As however the hydrogen occurs in bubbles which are so fine that they are capable of passing through the diaphragm, which in view of its electrical resistance must not have too fine a mesh, a porous diaphragm will not entirely prevent the gases from mixing. For this reason, other means are employed which consist in allowing the electrolyte to flow entirely or partly from the anode space through the diaphragm to the cathode space. The stream of liquid thus formed, prevents the hydrogen from entering the anode space.

Having now particularly described and ascertained the nature of my said invention and in what manner the same is to be performed, I declare that what I claim is:—

The herein described process for the recovery of pure caustic alkalies from impure alkali lyes, consisting in electrolyzing the said impure lyes, mercury cathodes being used, and decomposing the resulting alkali amalgam by water.

In testimony whereof I affix my signature in presence of two witnesses.

KARL HEINEMANN.

Witnesses:
  Dr. Ing. DESIDERIUS STEINER,
  INGENIEUR PHILIPP FRANZ.